Patented May 17, 1927.

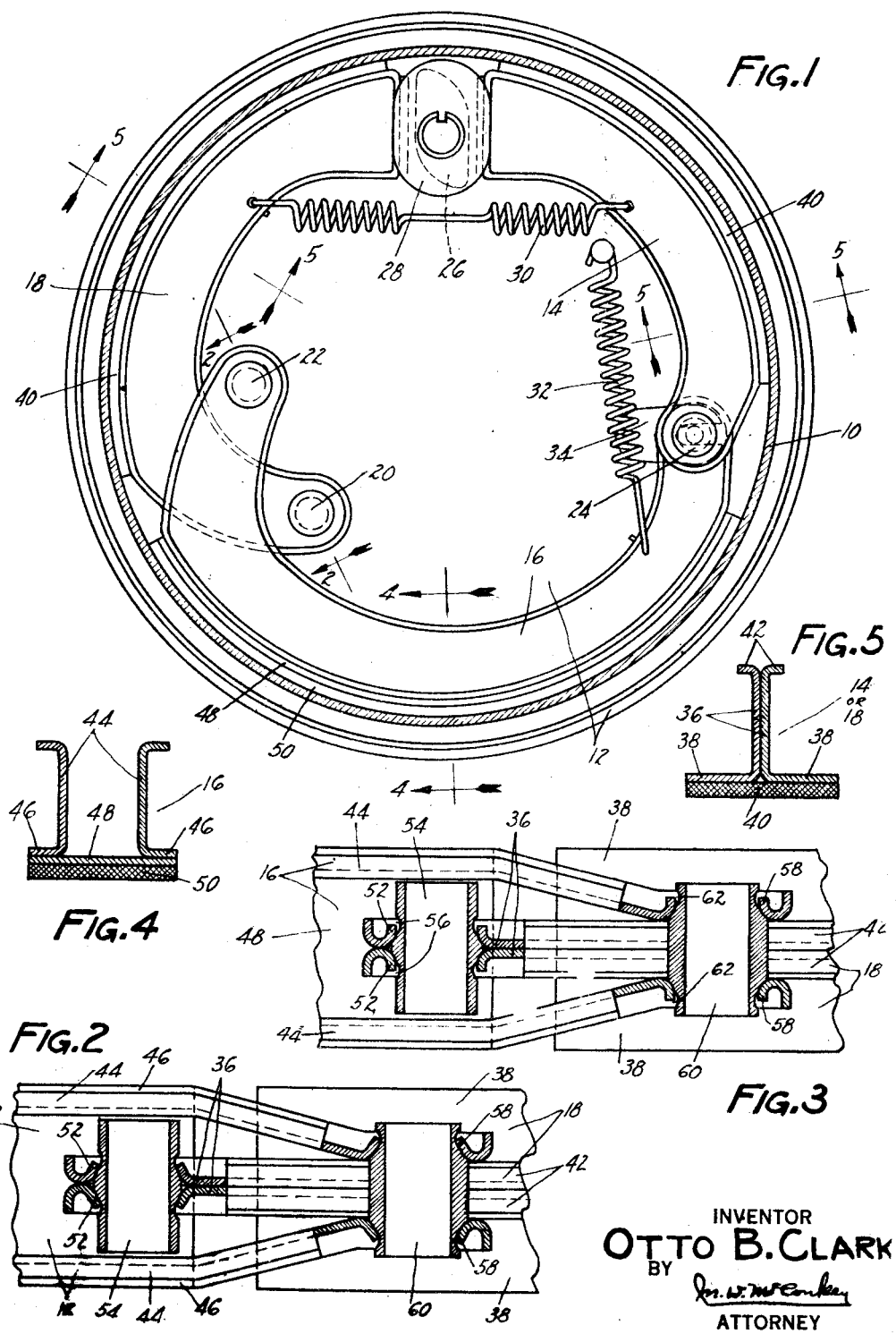

1,628,951

UNITED STATES PATENT OFFICE.

OTTO B. CLARK, OF EVANSVILLE, INDIANA, ASSIGNOR TO BENDIX BRAKE COMPANY, OF CHICAGO, ILLINOIS, A CORPORATION OF ILLINOIS.

BRAKE SHOE.

Application filed July 28, 1926. Serial No. 125,464.

This invention relates to brakes, and is illustrated as embodied in an internal expanding automobile brake. An object of the invention is to provide for permanently locking a bushing (for the shoe pivot) to the end of the brake shoe, by displacing the metal of the shoe over shoulders on the bushing. Preferably the shoulders are formed by grooving the bushing, and the bushing is sleeved in tubular flanges of the shoe which are spun into the grooves. In one form of shoe the bushing also serves as a reinforcing member connecting spaced anchoring arms in which the tubular flanges are formed.

The above and other objects and features of the invention, including various novel and desirable particular details of construction, will be apparent from the following description of one illustrative embodiment shown in the accompanying drawing, in which:

Figure 1 is a vertical section through the brake, just inside the head of the brake drum, and showing the shoes in side elevation;

Figure 2 is a partial section on the line 2—2 of Figure 1, showing the bushings of two of the shoes;

Figure 3 is a view corresponding to Figure 2, but showing the parts before the bushings are fastened to the shoes;

Figure 4 is a section through the center shoe on the line 4—4 of Figure 1; and

Figure 5 is a section through either of the other shoes on the lines 5—5 of Figure 1.

The brake selected for illustration comprises a rotatable drum 10, at the open side of which there may be a suitable support such as a backing plate 12, and within which are arranged three shoes 14, 16, and 18. Shoe 18 is anchored on a pivot 20 carried by the backing plate, shoe 16 is anchored on a pivot 22, and shoe 14 is connected to shoe 16 by a pivot 24.

The brake may be applied by means such as a double cam 26, shown with an end flange 28 laterally confining the free ends of the shoes, and which forces shoes 14 and 18 apart against the resistance of a return spring 30. Shoe 16 is applied by shoe 14, against the resistance of an auxiliary return spring 32. The idle position of pivot 24, with the brake released, is determined by any suitable stop 34.

Each of the shoes 14 and 18 is shown as built up of two stampings rivetted or otherwise secured back to back, and including plane or radial flanges 36 jointly forming the stiffening web of the shoe, and cylindrical oppositely-extending flanges 38 forming the friction face and carrying the brake lining 40. The inner edges of the web flanges 36 may be stiffened by short lateral flanges 42. The flanges 36 at the lower end of shoe 18 may be projected within the curve of the shoe to form an anchoring arm mounted on pivot 20.

Shoe 16 is shown as built up of two spaced stampings 44, which may have short inner strengthening lateral flanges, and which have cylindrical outer flanges 46 riveted or spot-welded or otherwise secured to a cylindrical section of band 48 forming the friction face and carrying the brake lining 50. Stampings 44 project beyond the ends of the friction face to straddle the ends of shoes 14 and 18, and at the left end of shoe 16 they are offset within the curve of the shoe to be mounted on pivot 22.

The present invention relates to providing shoes of this general type with bushings for pivots such as the pivots 20 and 22, whether or not the shoes are of the exact construction described above, and whether or not they are used in the particular brake illustrated.

In the embodiment illustrated, shoe 18 is provided with alined openings in its flanges 36, preferably with the metal drawn in opposite directions about the openings to form tubular flanges 52, and with the openings sleeved on a cylindrical bushing 54. Bushing 54 is grooved at 56 to form shoulders facing in opposite directions, and over which the metal of flanges 52 is displaced by spinning or otherwise distorting the flanges into the grooves.

Shoe 16 is provided with openings having drawn tubular flanges 58 projecting in opposite directions away from the center of the shoe, and sleeved on a bushing 60. Bushing 60 is grooved at 62 to form shoulders over which flanges 58 are spun or otherwise displaced.

While one illustrative embodiment has been described in detail, it is not my intention to limit the scope of the invention to that particular embodiment, or otherwise than by the terms of the appended claims.

I claim:

1. A brake shoe having two portions formed with alined openings, the metal about the openings being drawn out to form tubular flanges, in combination with a bushing in the openings having grooves opposite said tubular flanges, the flanges being spun into the grooves to lock the bushing to the shoe.

2. A brake shoe having two portions formed with alined openings, the metal about the openings being drawn out in opposite directions to form tubular flanges projecting away from the center of the shoe, in combination with a bushing in the openings having grooves opposite said tubular flanges, the flanges being spun into the grooves to lock the bushing to the shoe.

3. A brake shoe having two portions formed with alined openings, the metal about the openings being drawn out to form tubular flanges, in combination with a bushing in the openings having grooves opposite said tubular flanges, the flanges being spun into the grooves to lock the bushing to the shoe, the said two portions of the shoe being spaced a considerable distance apart and connected by the bushing.

4. A brake shoe having two portions formed with alined openings, a bushing in said openings having shoulders adjacent said portions, with the metal of said portions of the shoe about the openings displaced over the shoulders of the bushing to lock the bushing permanently to the shoe.

5. A brake shoe having two portions formed with alined openings, a bushing in said openings having shoulders adjacent said portions and facing away from the center of the shoe, with the metal of said portions of the shoe about the openings displaced over the shoulders of the bushing to lock the bushing permanently to the shoe.

In testimony whereof, I have hereunto signed my name.

OTTO B. CLARK.